(12) United States Patent
Martin (10) Patent No.: US 11,868,030 B2
(45) Date of Patent: Jan. 9, 2024

(54) SYSTEM, APPARATUS, AND METHOD FOR PROVIDING AN ADJUSTABLE SUPPORT

(71) Applicant: Kevin Martin, Palisades Park, NJ (US)

(72) Inventor: Kevin Martin, Palisades Park, NJ (US)

( * ) Notice: Subject to any disclaimer, the term of this patent is extended or adjusted under 35 U.S.C. 154(b) by 199 days.

(21) Appl. No.: 17/410,628

(22) Filed: Aug. 24, 2021

(65) Prior Publication Data

US 2022/0066293 A1    Mar. 3, 2022

Related U.S. Application Data

(60) Provisional application No. 63/070,186, filed on Aug. 25, 2020.

(51) Int. Cl.
| | |
|---|---|
| *G03B 17/56* | (2021.01) |
| *F16M 11/42* | (2006.01) |
| *A47C 7/00* | (2006.01) |
| *A47C 3/20* | (2006.01) |
| *A47C 13/00* | (2006.01) |

(52) U.S. Cl.
CPC .............. *G03B 17/561* (2013.01); *A47C 3/20* (2013.01); *A47C 7/006* (2013.01); *A47C 13/005* (2013.01); *F16M 11/42* (2013.01)

(58) Field of Classification Search
CPC ........ G03B 17/561; G03B 17/56; A47C 3/20; A47C 7/006; A47C 13/005; F16M 11/42
USPC .................. 248/558, 346.01, 346.02, 346.07
See application file for complete search history.

(56) References Cited

U.S. PATENT DOCUMENTS

| | | | | |
|---|---|---|---|---|
| 4,305,508 A | * | 12/1981 | Rodgers ................. | B65D 85/68 248/346.02 |
| 4,382,733 A | * | 5/1983 | Rodgers ............. | B65D 19/0095 248/346.02 |
| 5,676,063 A | * | 10/1997 | Wallace ................. | B65D 19/44 108/55.3 |
| 6,886,787 B2 | * | 5/2005 | Stahl ..................... | B62B 3/1476 206/508 |
| 7,140,622 B1 | * | 11/2006 | Cantu ................ | F16M 11/2021 108/55.3 |
| 7,871,046 B2 | * | 1/2011 | Munro ................... | B65G 1/026 248/346.02 |
| 8,827,219 B2 | * | 9/2014 | Kessler ................ | F16M 11/041 396/428 |
| 9,739,397 B2 | * | 8/2017 | Pratt ................... | B65D 19/0085 |
| 2007/0107639 A1 | * | 5/2007 | Dixon ................ | B65D 19/0014 108/51.3 |
| 2012/0138765 A1 | * | 6/2012 | Barthelmie .......... | C21D 9/0025 248/346.02 |
| 2014/0367544 A1 | * | 12/2014 | Graves .................... | B60B 33/00 248/346.02 |
| 2020/0095760 A1 | * | 3/2020 | Fisk, III .............. | E04B 1/34384 |
| 2022/0034142 A1 | * | 2/2022 | Martin ................. | G03B 17/561 |

* cited by examiner

*Primary Examiner* — Nkeisha Smith
(74) *Attorney, Agent, or Firm* — Keefe IP Law, PLLC (57) ABSTRACT

A method is disclosed. The method includes providing a body assembly including a first recess, a second recess, and a third recess, providing a film apple box, and selectively supporting a first end portion of the film apple box in the first recess in a first orientation. The method also includes selectively supporting a second end portion of the film apple box in the second recess in a second orientation, and selectively supporting a third end portion of the film apple box in the third recess in a third orientation.

19 Claims, 10 Drawing Sheets

SYSTEM, APPARATUS, AND METHOD FOR PROVIDING AN ADJUSTABLE SUPPORT

RELATED APPLICATIONS

This application claims the benefit of U.S. Provisional Patent Application No. 63/070,186 filed on Aug. 25, 2020, which is hereby incorporated by reference in its entirety.

TECHNICAL FIELD

The present disclosure generally relates to a system, apparatus, and method for providing a support, and more particularly to a system, apparatus, and method for providing an adjustable support.

BACKGROUND

Filmmaking and video production involves camera work in which camera operators and technicians remain in awkward or uncomfortable positions for extended periods of time. For example, camera operators and other technicians at a film or television set or location frequently crouch or sit in uncomfortable positions for a variety of reasons for long periods of time.

Conventional seats and supports for use by technicians and camera operators for maintaining an uncomfortable position for an extended period of time typically involve complex arrangements for adjusting a seat to various positions. These complex arrangements are expensive, with independent filmmaking crews typically unable to afford such systems. Further, conventional systems are often fragile and easily damaged and broken during the typical wear and tear that accompanies film and television production.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method. The method includes providing a body assembly including a first recess, a second recess, and a third recess, providing a film apple box, and selectively supporting a first end portion of the film apple box in the first recess in a first orientation. The method also includes selectively supporting a second end portion of the film apple box in the second recess in a second orientation, and selectively supporting a third end portion of the film apple box in the third recess in a third orientation.

In another aspect, the present disclosure is directed to an apparatus configured to support a film apple box during film or television shooting. The apparatus includes at least one base structural member, and a plurality of width structural members and length structural members disposed on the at least one base structural member and forming a first recess with the at least one base structural member, the first recess configured to selectively receive a first end portion of the film apple box. The apparatus also includes a plurality of second-recess structural members disposed on the plurality of width structural members and length structural members and forming a second recess with the plurality of width structural members and length structural members, the second recess configured to selectively receive a second end portion of the film apple box, and a plurality of third-recess structural members disposed on the plurality of second-recess structural members and forming a third recess with the plurality of second-recess structural members, the third recess configured to selectively receive a third end portion of the film apple box.

DETAILED DESCRIPTION AND INDUSTRIAL APPLICABILITY

FIGS. 1, 2, 3A-3E, 4A-4D, and 5 illustrate an exemplary embodiment of the exemplary disclosed system, apparatus, and method. System 100 may include an apparatus 105. Apparatus 105 may be an assembly for supporting a user or equipment. Apparatus 105 may be used in any suitable application for supporting a user in a challenging (e.g., an otherwise awkward or uncomfortable) position for an extended period of time. Apparatus 105 may be used in film, video, or television shooting or production work. Apparatus 105 may be used in any suitable activity involving crouching or kneeling such as, for example, construction work or tradesman activities (e.g., by carpenters, plumbers, masons, or other technicians). Apparatus 105 may be used in any suitable activity in which a user spends a significant amount of time working in a low, crouched position.

Figure 5:
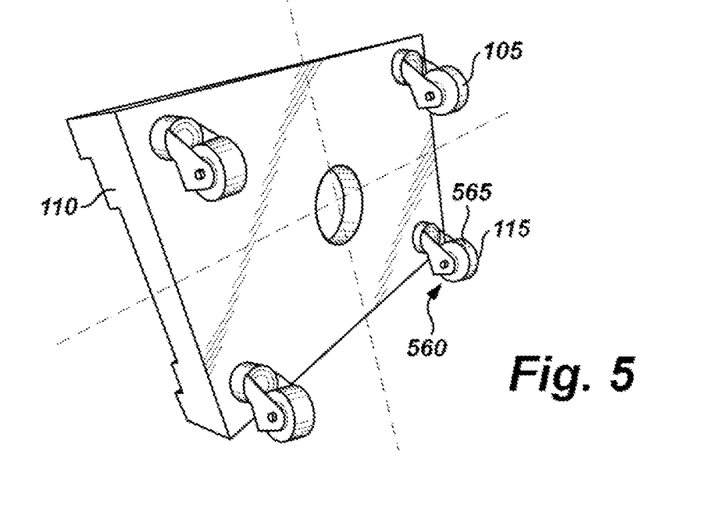
FIG. 5 is a perspective view of at least some exemplary embodiments of the present invention.

As illustrated in FIG. 5, apparatus 105 may include a body assembly 110 and a movement assembly 115. Movement assembly 115 may be attached to body assembly 110 and may movably support body assembly 110.

Returning to FIG. 1, body assembly 110 may include a plurality of layers of structural members. For example, body assembly 110 may include a first structural layer 200, a second structural layer 300, a third structural layer 400, and a fourth structural layer 500. First structural layer 200, second structural layer 300, third structural layer 400, and fourth structural layer 500 may be stacked structural layers for example as described herein.

As illustrated in FIGS. 1, 2, 3A, and 3B, first structural layer 200 may include one or more base structural members 205. For example, first structural layer 200 may include a plurality of base structural members 205 that may be stacked (e.g., stacked on each other). Base structural members 205 may be attached to each other via any suitable attachment technique for example as described herein. In at least some exemplary embodiments, first structural layer 200 may include two base structural members 205.

Base structural member 205 may include a base aperture 210 that may extend through a thickness of base structural member 205. Base aperture 210 may be any suitable shape such as a circle, an ellipse, a square, a rectangle, a polygon, or any other desired shape. Base apertures 210 of respective base structural members 205 may be aligned (e.g., partially or substantially entirely aligned) when base structural members 205 are stacked. Base aperture 210 may be disposed at a central portion of base structural member 205 (e.g., or at any other desired location of base structural member 205). Base apertures 210 may provide a grip or handle for a user to pick up, hold, adjust, and/or carry apparatus 105.

Base aperture 210 may be formed by any suitable technique such as, for example, machining (e.g., machining using computer numerical control), a jig, a handheld router, and/or any other suitable technique or combination of techniques. Similar techniques may also be used to form designs as desired in exterior surface portions of body assembly 110.

Figure 4A:
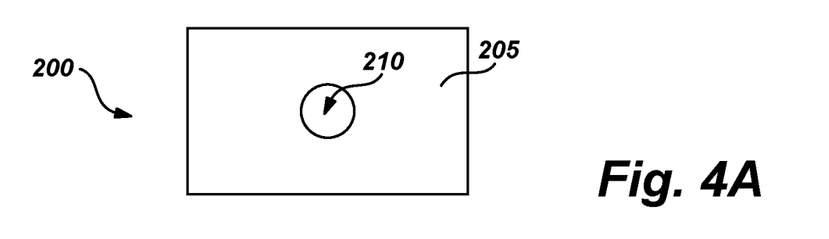
FIG. 4A is a top view of at least some exemplary embodiments of the present invention.

Base structural member 205 may be of any suitable size or dimensions for providing a structural base for body assembly 110. For example, base structural member 205 may have a length (e.g., longest dimension) of between about 20" and about 30", between about 22" and about 25", or between about 22" and about 24" (e.g., about 23"). Base structural member 205 may have a width of between about 10" and about 20", between about 12" and about 18", or between about 14" and about 16" (e.g., about 15"). Base structural member 205 may have a thickness of between about ½" and about 1", or between about ⅝" and about ⅞" (e.g., about ¾"). For example when base structural member 205 may be formed from wood for example as described herein, each stacked base structural member 205 may have a length of about 23", a width of about 15", and a thickness of about ¾". Base aperture 210 may have a largest dimension (e.g., a diameter) of between about 2" and about 6" (e.g., about 4") or any other suitable dimension or configuration. FIG. 4A illustrates a top view of first structural layer 200.

Second structural layer 300 may include a plurality of structural members that may be disposed on and/or attached to first structural layer 200 via any suitable attachment technique for example as described herein. Second structural layer 300 may include a plurality of width structural members 305 and a plurality of length structural members 310. For example, second structural layer 300 may include two width structural members 305 and two length structural members 310.

Figure 1:
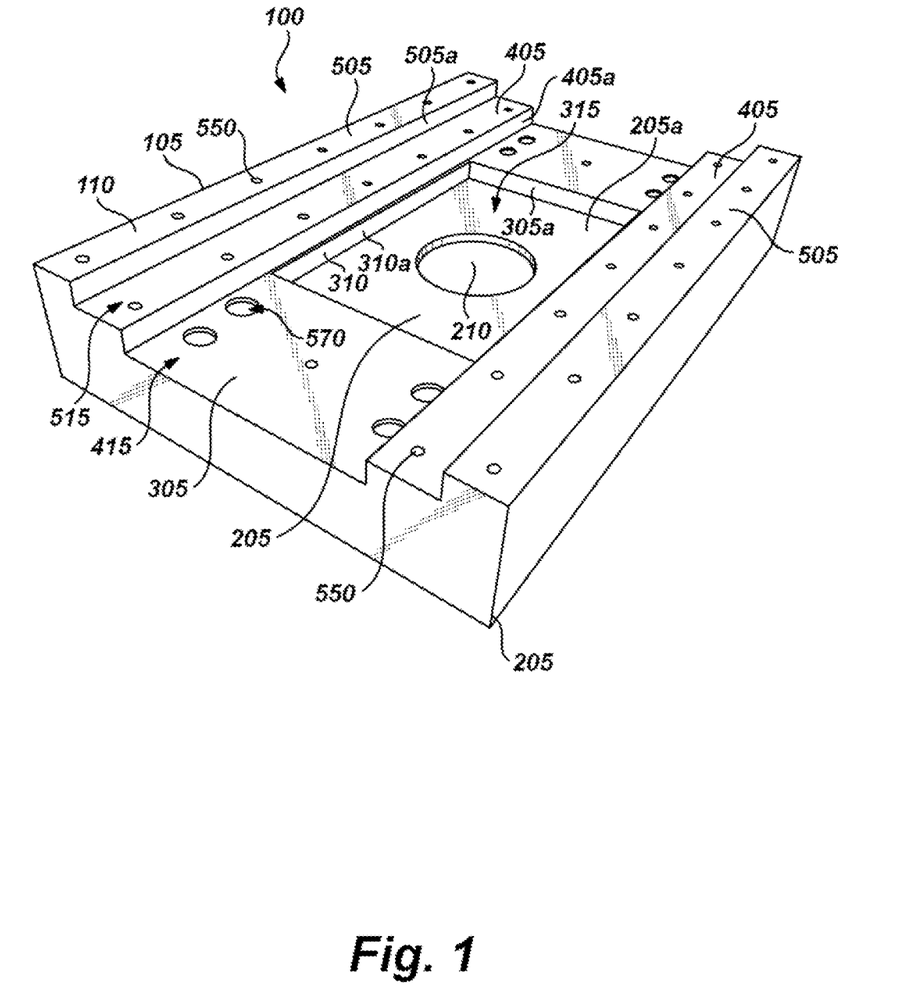
FIG. 1 is a perspective view of at least some exemplary embodiments of the present invention.
Figure 4B:
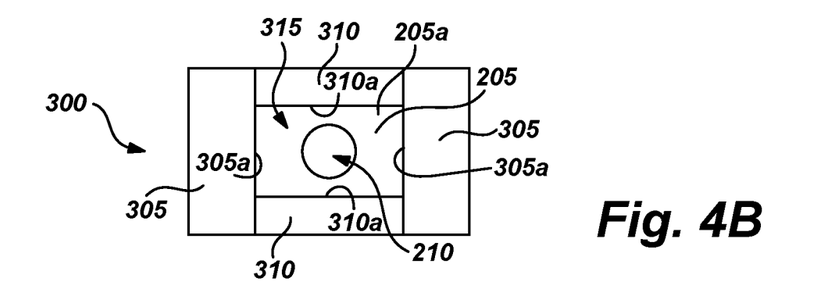
FIG. 4B is a top view of at least some exemplary embodiments of the present invention.

The plurality of width structural members 305 and the plurality of length structural members 310 may form a first recess 315. For example as illustrated in FIGS. 1 and 4B, first recess 315 may be formed and bounded by an upper surface 205a of base structural member 205 (e.g., of the top base structural member 205), side surfaces 305a of width structural members 305, and side surfaces 310a of length structural member 310. First recess 315 may be configured or dimensioned to receive a film apple box 600 for example as described herein. FIG. 4B illustrates a top view of second structural layer 300 disposed (e.g., stacked and/or attached) on first structural layer 200 and forming first recess 315.

Width structural members 305 may extend along a substantially full width of first structural layer 200 (e.g., or along a partial width of first structural layer 200). Width structural member 305 may be of any suitable size or dimensions for forming first recess 315. For example, width structural member 305 may have a length (e.g., longest dimension) of between about 10" and about 20", between about 12" and about 18", or between about 14" and about 16" (e.g., about 15"). Width structural member 305 may have a width of between about 3" and about 8", between about 4" and about 6", or between about 5" and about 6" (e.g., about 5½"). Width structural member 305 may have a thickness of between about ½" and about 1", or between about ⅝" and about ⅞" (e.g., about ¾"). When width structural member 305 may be formed from wood for example as described herein, each width structural member 305 may have a length of about 15", a width of about 5½", and a thickness of about ¾".

Length structural members 310 may extend along a partial length of first structural layer 200 (e.g., or along a substantially full length of first structural layer 200). Length structural member 310 may be of any suitable size or dimensions for forming first recess 315. For example, length structural member 310 may have a length (e.g., longest dimension) of between about 8" and about 16", between about 10" and about 14", or between about 11" and about 13" (e.g., about 12"). Length structural member 310 may have a width of between about 2" and about 6", between about 3" and about 5", or between about 3" and about 4" (e.g., about 3 1/2"). Length structural member 310 may have a thickness of between about ½" and about 1", or between about ⅝" and about ⅞" (e.g., about ¾"). When length structural member 310 may be formed from wood for example as described herein, each length structural member 310 may have a length of about 12", a width of about 3½", and a thickness of about ¾".

Third structural layer 400 may include a plurality of structural members that may be disposed on and/or attached to second structural layer 300 via any suitable attachment technique for example as described herein. Third structural layer 400 may include a plurality of second-recess structural members 405. For example, third structural layer 400 may include two second-recess structural members 405.

Figure 4C:
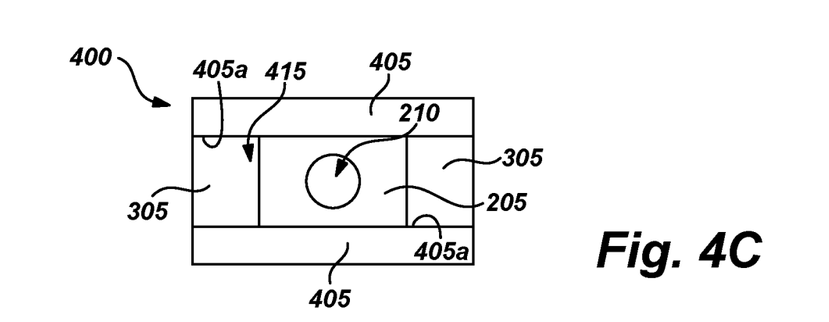
FIG. 4C is a top view of at least some exemplary embodiments of the present invention.

The plurality of second-recess structural members 405 may form a second recess 415. For example as illustrated in FIGS. 1 and 4C, second recess 415 may be formed and bounded by side surfaces 405a of second-recess structural members 405. Second recess 415 may be configured or dimensioned to receive film apple box 600 for example as described herein. FIG. 4C illustrates a top view of third structural layer 400 disposed (e.g., stacked and/or attached) on second structural layer 300 and forming second recess 415.

Second-recess structural members 405 may extend along a substantially full length of second structural layer 300 and first structural layer 200 (e.g., or along a partial length of second structural layer 300 and first structural layer 200). Second-recess structural member 405 may be of any suitable size or dimensions for forming second recess 415. For example, second-recess structural member 405 may have a length (e.g., longest dimension) of between about 20" and about 30", between about 22" and about 25", or between about 22" and about 24" (e.g., about 23"). Second-recess structural member 405 may have a width of between about 2" and about 6", between about 3" and about 5", or between about 3" and about 4" (e.g., about 3 1/2"). Second-recess structural member 405 may have a thickness of between about ½" and about 1", or between about ⅝" and about ⅞" (e.g., about ¾"). When second-recess structural member 405 may be formed from wood for example as described herein, each second-recess structural member 405 may have a length of about 23", a width of about 3½", and a thickness of about ¾".

Figure 2:
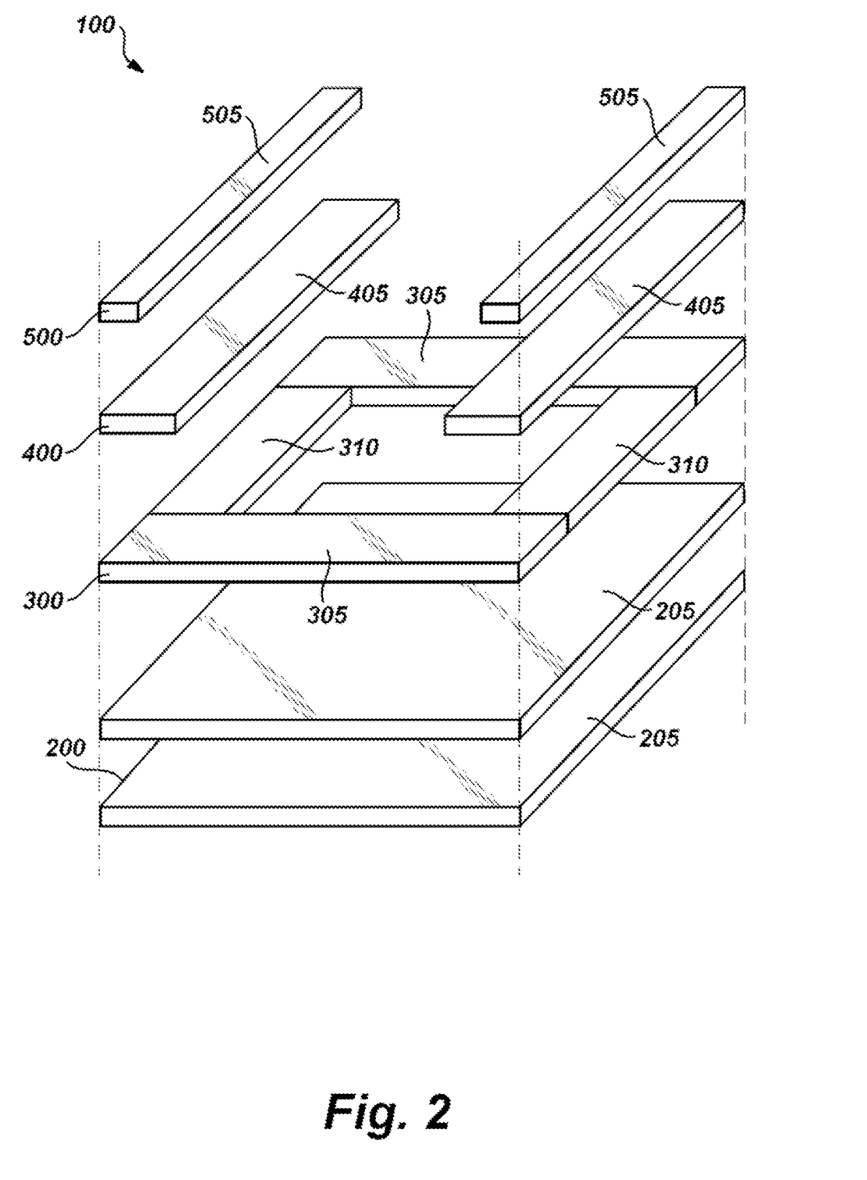
FIG. 2 is an exploded, perspective view of at least some exemplary embodiments of the present invention.
Figure 3A:
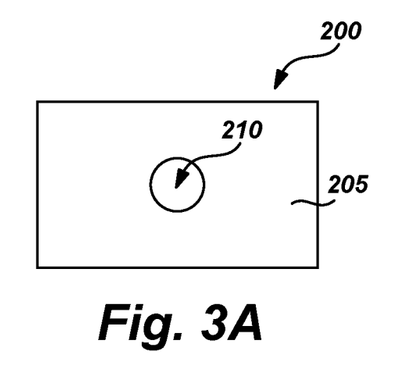
FIG. 3A is a top view of at least some exemplary embodiments of the present invention.
Figure 3B:
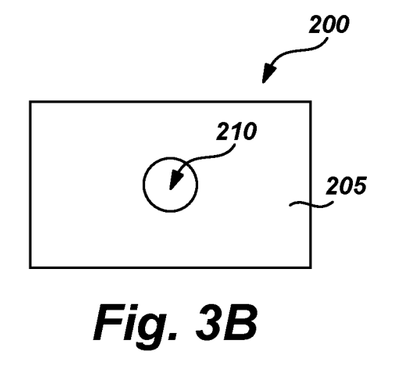
FIG. 3B is a top view of at least some exemplary embodiments of the present invention.
Figure 3C:
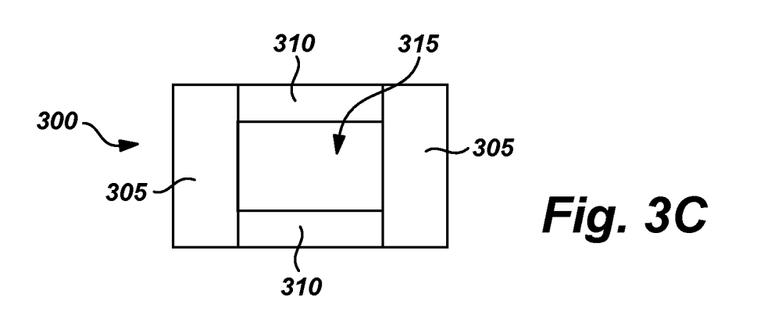
FIG. 3C is a top view of at least some exemplary embodiments of the present invention.
Figure 3D:
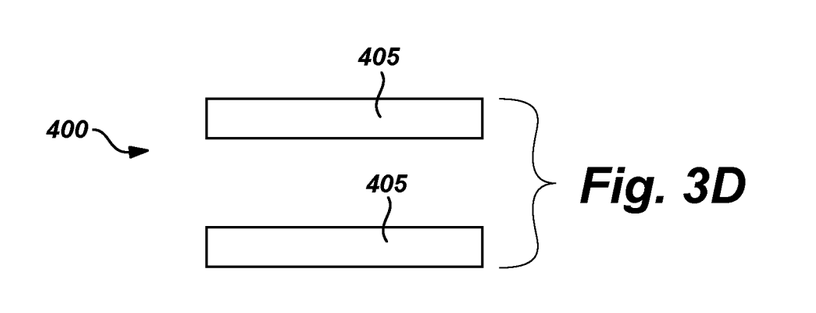
FIG. 3D is a top view of at least some exemplary embodiments of the present invention.
Figure 3E:
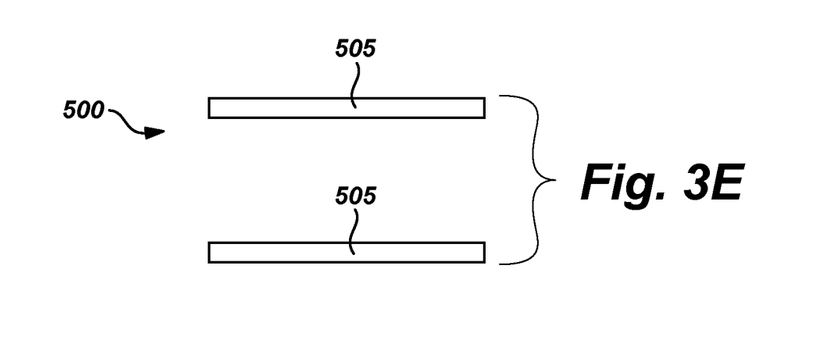
FIG. 3E is a top view of at least some exemplary embodiments of the present invention.

In at least some exemplary embodiments and for example as illustrated in FIGS. 1 and 2, each second-recess structural member 405 may overlap some or all of length structural member 310 and portions (e.g., end portions) of width structural members 305. For example, each second-recess structural member 405 may extend across a substantially entire length of first structural layer 200, disposed on top of length structural member 310, which may extend across a partial length of first structural layer 200.

Fourth structural layer 500 may include a plurality of structural members that may be disposed on and/or attached to third structural layer 400 via any suitable attachment technique for example as described herein. Fourth structural layer 500 may include a plurality of third-recess structural members 505. For example, fourth structural layer 500 may include two third-recess structural members 505.

Figure 4D:
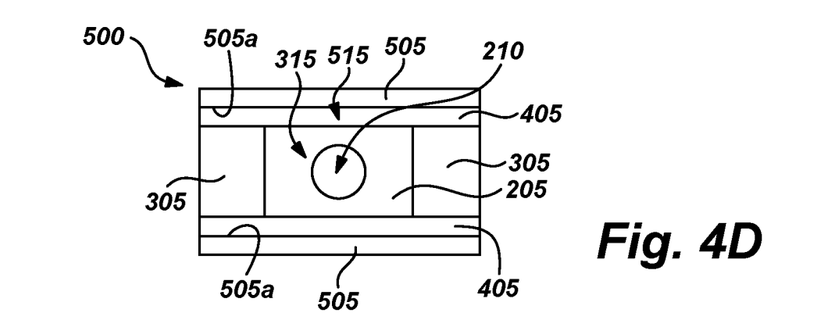
FIG. 4D is a top view of at least some exemplary embodiments of the present invention.

The plurality of third-recess structural members 505 may form a third recess 515. For example as illustrated in FIGS. 1 and 4D, third recess 515 may be formed and bounded by side surfaces 505a of third-recess structural members 505. Third recess 515 may be configured or dimensioned to receive film apple box 600 for example as described herein. FIG. 4D illustrates a top view of fourth structural layer 500 disposed (e.g., stacked and/or attached) on third structural layer 400 and forming third recess 515.

Third-recess structural members 505 may extend along a substantially full length of third structural layer 400, second structural layer 300, and first structural layer 200 (e.g., or along a partial length of third structural layer 400, second structural layer 300, and first structural layer 200). Third-recess structural member 505 may be of any suitable size or dimensions for forming third recess 515. For example, third-recess structural member 505 may have a length (e.g., longest dimension) of between about 20" and about 30", between about 22" and about 25", or between about 22" and about 24" (e.g., about 23"). Third-recess structural member 505 may have a width of between about 1" and about 4", between about 1" and about 3", or between about 1" and about 2" (e.g., about 1½"). Third-recess structural member 505 may have a thickness of between about ½" and about 1", or between about ⅝" and about ⅞" (e.g., about ¾"). For example when third-recess structural member 505 may be formed from wood for example as described herein, each third-recess structural member 505 may have a length of about 23", a width of about 1½", and a thickness of about ¾".

Body assembly 110 (e.g., including the exemplary disclosed structural members of first structural layer 200, second structural layer 300, third structural layer 400, and fourth structural layer 500) may be formed from any suitable structural material such as, for example, wood, metal, plastic, carbon fiber, and/or foam material. For example, body assembly 110 may be formed from wood material such as birch, oak, mahogany, sapele, okoume, maple, cherry, walnut, and/or any other suitable type of wood. In at least some exemplary embodiments, body assembly 110 may be formed from white birch, Chinese birch, red oak, and/or white oak. Body assembly 110 may be plywood. Body assembly 110 may be formed from plywood members having a thickness of about ¾" (e.g., and/or about ½").

Body assembly 110 may be integrally formed from a single material. For example, first structural layer 200, second structural layer 300, third structural layer 400, and fourth structural layer 500 may be integrally formed as integral portions of one or more members. In at least some exemplary embodiments, body assembly 110 may be formed from metal material such as, for example, aluminum. For example, body assembly 110 may be cut, carved, or machined (e.g., cut via CNC machining) from a single piece (e.g., block) of material such as metal material (e.g., aluminum), wood material, plastic material, or any other suitable structural material.

For example as illustrated in FIG. 1, body assembly 110 (e.g., including the exemplary disclosed structural members of first structural layer 200, second structural layer 300, third structural layer 400, and fourth structural layer 500) may be attached together via any suitable technique such as, for example, mechanical fasteners, adhesives, welding, and/or any other suitable method. In at least some exemplary embodiments, body assembly 110 (e.g., including the exemplary disclosed structural members of first structural layer 200, second structural layer 300, third structural layer 400, and fourth structural layer 500) may be fastened via a plurality of fasteners 550.

In at least some exemplary embodiments and as illustrated in FIG. 1, fasteners 550 may be exposed at exterior surfaces of body assembly 110. Exposed surfaces of fasteners 550 may be flush with or disposed in recesses (e.g., "buried") at exterior surfaces of body assembly 110. Exterior surfaces (e.g., a top, bottom, rear, and both side surfaces) of apparatus 105 may thereby be substantially flat and smooth without fasteners 550 extending out from exterior surfaces of apparatus 105.

Fasteners 550 may be any suitable fasteners such as screws, bolts, nails, staples, and/or any other suitable fastener. In at least some exemplary embodiments, fasteners 550 may be screws of any suitable size and length (e.g., 33 mm or 40 mm wood screws). In at least some exemplary embodiments, fasteners 550 may be steel screws of between about 1" and about 2" in length (e.g., 1⅝" length) or any other suitable size.

Fasteners 550 may be countersunk into body assembly 110. Fasteners 550 may be screwed into body assembly 110 using guides or pilot holes (e.g., pre-drilled holes) to facilitate tightly gripping attachment between opposing surfaces of the attached exemplary disclosed members (e.g., to avoid cracking). Fasteners 550 may thereby durably attach body assembly 110 together so that apparatus 105 does not break apart or crack when dropped and used in supporting users and/or equipment such as relatively heavy camera equipment.

In at least some exemplary embodiments and as illustrated in FIG. 5, movement assembly 115 may include a plurality of wheel assemblies 560 for allowing a user to move (e.g., roll) apparatus 105. Wheel assemblies 560 may allow a user to smoothly move apparatus 105. Wheel assembly 560 may include a caster wheel 565. In at least some exemplary embodiments, apparatus 105 may include four wheel assemblies 560 (e.g., or any other suitable number) that may be attached (e.g., via bolts and nuts, screws, and/or any other suitable attachment technique) to body assembly 110. Wheel assemblies 560 may be attached to a lower base structural member 205 (e.g., and an upper base structural member 205) of first structural layer 200. For example, wheel assembly 560 may be attached to body assembly 110 via one or more bolts (e.g., a plurality of bolts). For example as illustrated in FIG. 1, wheel apertures 570 may be provided in body assembly 110 (e.g., in first structural layer 200) to receive bolts of wheel assemblies 560. In at least some exemplary embodiments, wheel assemblies 560 may be of any suitable height so as to provide clearance for the exemplary disclosed storage areas described for example below.

Figure 6:
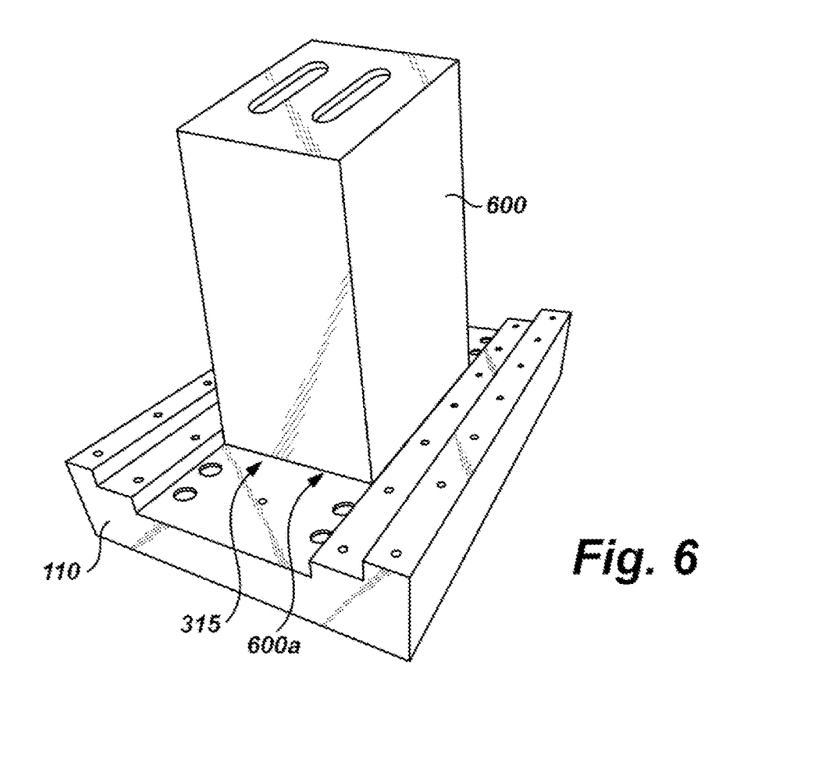
FIG. 6 is a perspective view of at least some exemplary embodiments of the present invention.
Figure 7:
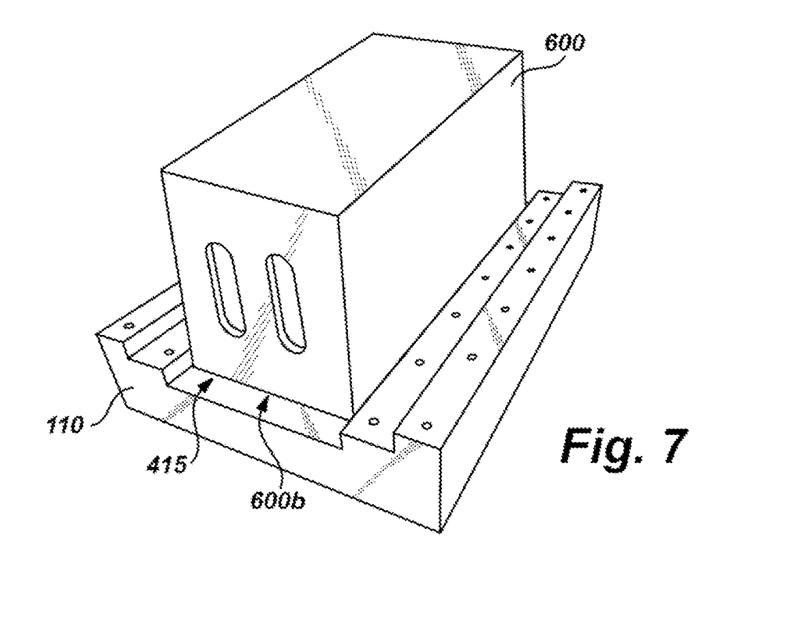
FIG. 7 is a perspective view of at least some exemplary embodiments of the present invention.
Figure 8:
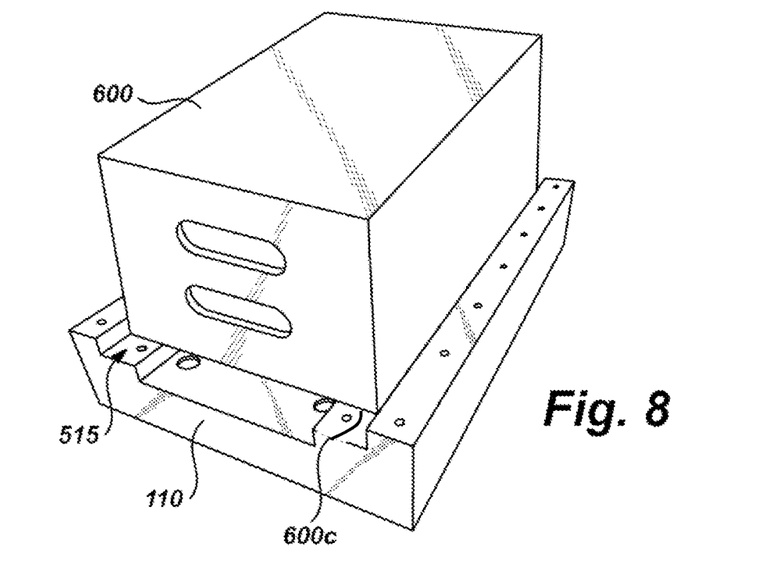
FIG. 8 is a perspective view of at least some exemplary embodiments of the present invention.

For example as illustrated in FIGS. 6-8, apparatus 105 may be configured to receive and support film apple box 600. Film apple box 600 may have any suitable dimensions for use by professionals (e.g., grips) in film and video production, television production, and camera work. Film apple box 600 may be a full apple box (e.g., a "full apple") having dimensions of 20"×12"×8". Film apple box 600 may also be a "half apple" (e.g., 20"×12"×4"), a "quarter apple" (e.g., 20"×12"×2"), or a "pancake" (e.g., 20"×12"×1"). Film apple box 600 may also be a mini apple box (e.g., a "mini") having dimensions of 10"×12"×8". Film apple box 600 may also be a "mini half" (e.g., 10"×12"×4"), a "mini quarter" (e.g., 10"×12"×2"), or a "mini pancake" (e.g., 10"×12"×1").

Film apple box 600 may be oriented in any suitable direction suitable for film and video production, television production, and camera work using system 100. For example as illustrated in FIG. 6, film apple box 600 may be vertically supported in a first orientation or position such as a "New York position" in first recess 315 formed by second structural layer 300. A first end portion 600a of film apple box 600 may be supported in first recess 315. In the "New York position," film apple box 600 may stand with a longest dimension being a vertical dimension (e.g., 20" or any other desired dimension). For example as described herein, second structural layer 300 may be configured to provide first recess 315 having any suitable dimensions such as, for example, 8"×12" to support a "full apple" in the "New York position." Second structural layer 300 may also be configured to provide first recess 315 having suitable dimensions to support any of the other exemplary disclosed sizes of film apple box 600.

Also for example as illustrated in FIG. 7, film apple box 600 may be horizontally supported on its side in a second orientation or position such as a "Chicago position" (e.g., or a "Texas position") in second recess 415 formed by third structural layer 400. A second end portion 600b of film apple box 600 may be supported in second recess 415. In the "Chicago position," the vertical dimension of film apple box 600 may be 12" (e.g., or any other desired dimension). For example as described herein, third structural layer 400 may be configured to provide second recess 415 having any suitable dimensions such as, for example, 8"×20" (e.g., at least 20") to support a "full apple" in the "Chicago position."

Third structural layer 400 may also be configured to provide second recess 415 having suitable dimensions to support any of the other exemplary disclosed sizes of film apple box 600.

Further for example as illustrated in FIG. 8, film apple box 600 may be supported flatly in a third orientation or position such as an "L.A. position" in third recess 515 formed by fourth structural layer 500. A third end portion 600c of film apple box 600 may be supported in third recess 515. In the "L.A. position," the vertical dimension of film apple box 600 may be 8" (e.g., or any other desired dimension). For example as described herein, fourth structural layer 500 may be configured to provide third recess 515 having any suitable dimensions such as, for example, 12"×20" (e.g., at least 20") to support a "full apple" in the "L.A. position." Fourth structural layer 500 may also be configured to provide third recess 515 having suitable dimensions to support any of the other exemplary disclosed sizes of film apple box 600.

The exemplary disclosed system, apparatus, and method may be used in any suitable application for supporting a user or equipment. For example, the exemplary disclosed system, apparatus, and method may be used in any suitable application for supporting a user in a challenging (e.g., otherwise awkward or uncomfortable) position for an extended period of time. The exemplary disclosed system, apparatus, and method may be used in film, video, or television production work. The exemplary disclosed system, apparatus, and method may be used in any suitable activity involving crouching such as, for example, construction work or tradesman activities (e.g., by carpenters, plumbers, masons, or other technicians). The exemplary disclosed system, apparatus, and method may be used in any suitable activity in which a user spends a significant amount of time working in a low, crouched position.

Figure 9:
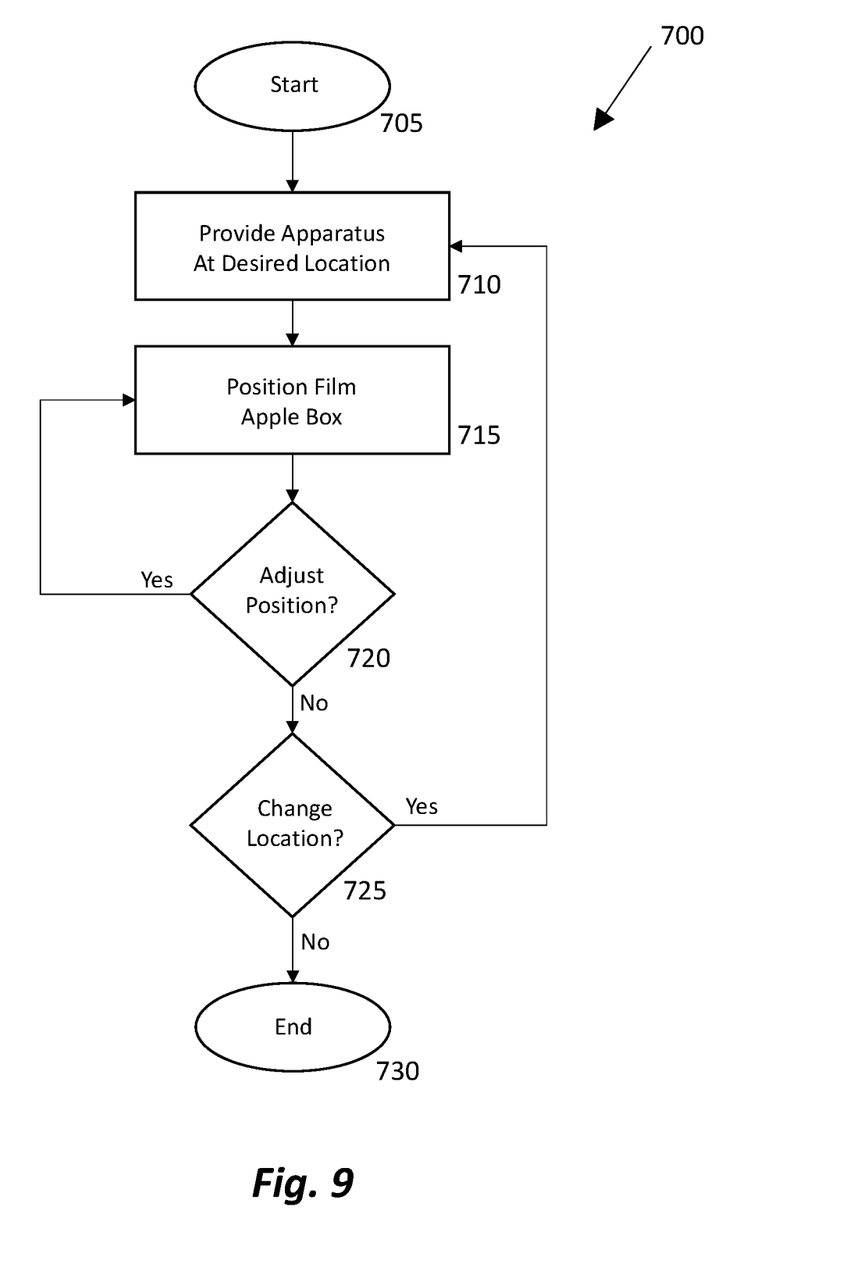
FIG. 9 illustrates an exemplary process of at least some exemplary embodiments of the present disclosure.

FIG. 9 illustrates an exemplary operation for using exemplary disclosed system 100. Process 700 begins at step 705. At step 710, a user may provide apparatus 105 at a desired location. For example, a user may provide apparatus 105 at a film or television filming location or at any other suitable location of an exemplary disclosed activity for example as described herein.

At step 715, a user may position film apple box 600 in any desired position (e.g., orientation) supported by apparatus 105. For example, film apple box 600 may be vertically supported in the "New York position" in first recess 315 formed by second structural layer 300 (e.g., as illustrated in FIG. 6). Also for example, film apple box 600 may be horizontally supported on its side in the "Chicago position" in second recess 415 formed by third structural layer 400 (e.g., as illustrated in FIG. 7). Further for example, film apple box 600 may be supported flatly in the "L.A. position" in third recess 515 formed by fourth structural layer 500 (e.g., as illustrated in FIG. 8). Film apple box 600 supported by apparatus 105 may be used in any of the exemplary disclosed positions to support a user (e.g., a grip or other film professional or technician) and/or equipment for any desired length of time. For example, a professional or technician such as a grip may sit on film apple box 600 supported by apparatus 105 in any desired position for an extended period of time (e.g., as an alternative to kneeling or crouching in an uncomfortable position for extended periods of time during a film or television shoot or other exemplary disclosed activity).

At step 720, a user may decide whether or not to adjust a position of film apple box 600 supported by apparatus 105 (e.g., as appropriate based on a progress of an activity such as a film or television shoot). If the position is to be adjusted, process 700 returns to step 715. The position of film apple box 600 may be iteratively changed on apparatus 105 as many times as desired (e.g., during an activity such as a film or television shoot or other exemplary disclosed activity). Also, a position of apparatus 105 supporting film apple box 600 may be changed by moving apparatus 105 using movement assembly 115. For example, a user may sit on film apple box 600 supported by apparatus 105 and roll around on apparatus 105 as desired (e.g., as suitable during a film or television shoot or other activity) using movement assembly 115. If the position or orientation of film apple box 600 on apparatus 105 is not to be changed, process 700 proceeds to step 725.

At step 725, a user may decide whether or not to change a location of film apple box 600 supported by apparatus 105 (e.g., as appropriate based on a progress of an activity such as a film or television shoot). If a location is to be changed, film apple box 600 may be removed from apparatus 105 and apparatus 105 may be picked up, carried, stored, and/or handled in any suitable way (e.g., via the gripping base aperture 210 as a handle). Process 700 may return to step 710, at which apparatus 105 may be used to support film apple box 600 at a new location. Steps 710, 715, 720, and 725 may be repeated iteratively as desired. If a location is not to be changed and a use of apparatus 105 has ended, process 700 ends at step 730.

FIGS. 10-13 illustrate another exemplary embodiment of the exemplary disclosed system, apparatus, and method. System 800 may be generally similar to system 100. System 800 may include an apparatus 805 including a body assembly 810 and a movement assembly 815 that may be similar to movement assembly 115.

Body assembly 810 may be formed from similar materials, include similar dimensions, and be similarly attached together as described above regarding body assembly 110. Body assembly 810 may include a storage assembly 820 and an adjustable assembly 825. Storage assembly 820 may store components of adjustable assembly 825.

Figure 10:
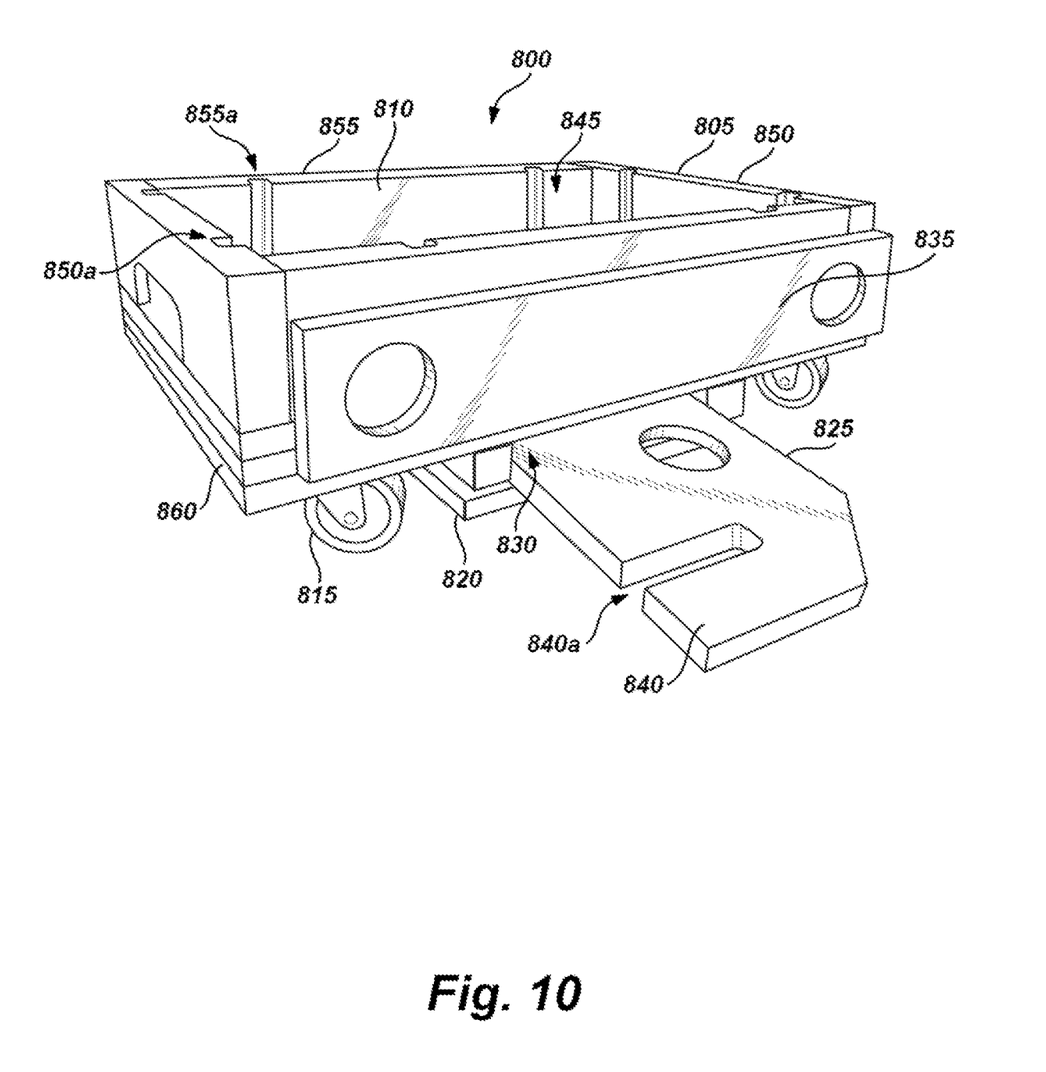
FIG. 10 is a perspective view of at least some exemplary embodiments of the present invention.

Storage assembly 820 may be formed from structural members similar to the exemplary disclosed structural members described herein, which may be attached to a lower portion of body assembly 810 (e.g., similar to base structural member 205) and each other to form a cavity 830. Cavity 830 may be configured to store components of adjustable assembly 825 (e.g., when they are not in use for example as illustrated in FIG. 10). Apparatus 105 also may include a storage assembly similar to storage assembly 820 of apparatus 805.

Adjustable assembly 825 may include a plurality of structural members that may be formed from similar materials as body assembly 810. For example, adjustable assembly 825 may include a plurality of first adjustable members 835 and a plurality of second adjustable members 840. First adjustable members 835 and second adjustable members 840 may be removably received in recesses of body assembly 810 for example as described below.

Body assembly 810 may include a plurality of receiving recesses in a plurality of structural members of body assembly 810 forming an adjustable recess 845. Body assembly 810 may include first structural members 850, second structural members 855, and one or more base structural members 860 that may form adjustable recess 845. For example as illustrated in FIGS. 10-13, each of a plurality (e.g., of two) of first adjustable members 835 may be received in corresponding receiving recesses 850a of first structural member 850. Each of a plurality (e.g., of two) of second adjustable members 840 may be received in corresponding receiving recesses 855a of second structural members 855. Further, when first adjustable members 835 are received in corresponding receiving recesses 850a and second adjustable members 840 are received in corresponding receiving recesses 855a, first adjustable members 835 may be received in receiving recesses 840a of second adjustable members 840. Further, first adjustable members 835, second adjustable members 840, first structural members 850, and/or second structural members 855 may include apertures that may be similar to base aperture 210 and that may serve as handles for body assembly 810 and components of adjustable assembly 825. Apparatus 105 may also include an adjustable assembly similar to adjustable assembly 825 of apparatus 805.

Figure 11:
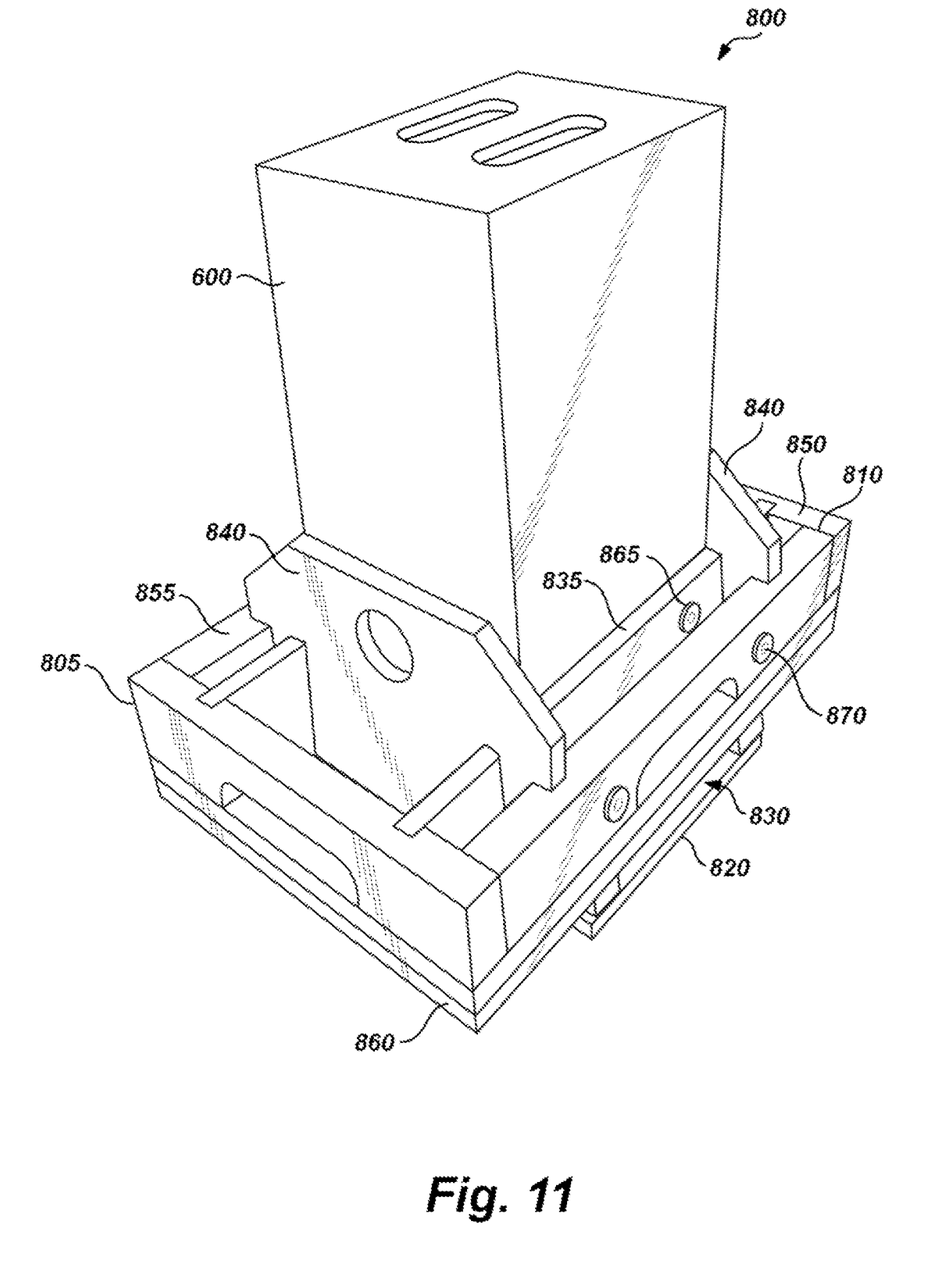
FIG. 11 is a perspective view of at least some exemplary embodiments of the present invention.

Film apple box 600 may be oriented in any suitable direction suitable for film and video production, television production, and camera work using system 800 (e.g., with a user removably disposing first adjustable members 835 and second adjustable member 840 in body assembly 810 for example as described herein). For example as illustrated in FIG. 11, film apple box 600 may be vertically supported in the "New York position" in adjustable recess 845. Film apple box 600 may be supported between first adjustable members 835 (e.g., with end portions received in receiving recesses 850a of first structural members 850, and intermediate portions received in receiving recesses 840a of second adjustable members 840) and second adjustable members 840 (e.g., with end portions received in receiving recesses 855a of second structural members 855).

Figure 12:
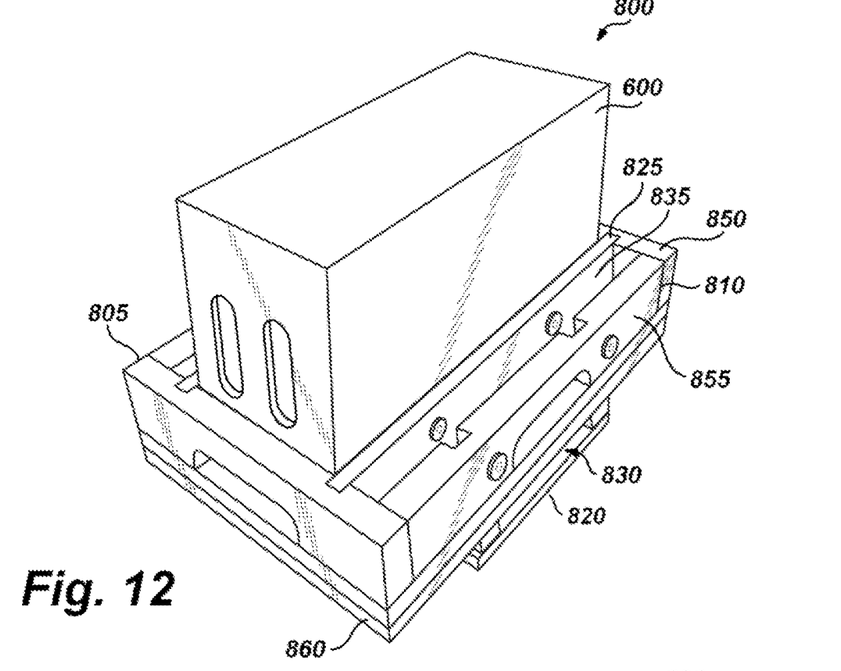
FIG. 12 is a perspective view of at least some exemplary embodiments of the present invention.

Also for example as illustrated in FIG. 12, film apple box 600 may be horizontally supported on its side in the "Chicago position" in adjustable recess 845. Film apple box 600 may be supported between first adjustable members 835 (e.g., with end portions received in receiving recesses 850a of first structural members 850) and first structural members 850. Second adjustable members 840 may be removed from receiving recesses 855a and stored for example in cavity 830.

Figure 13:
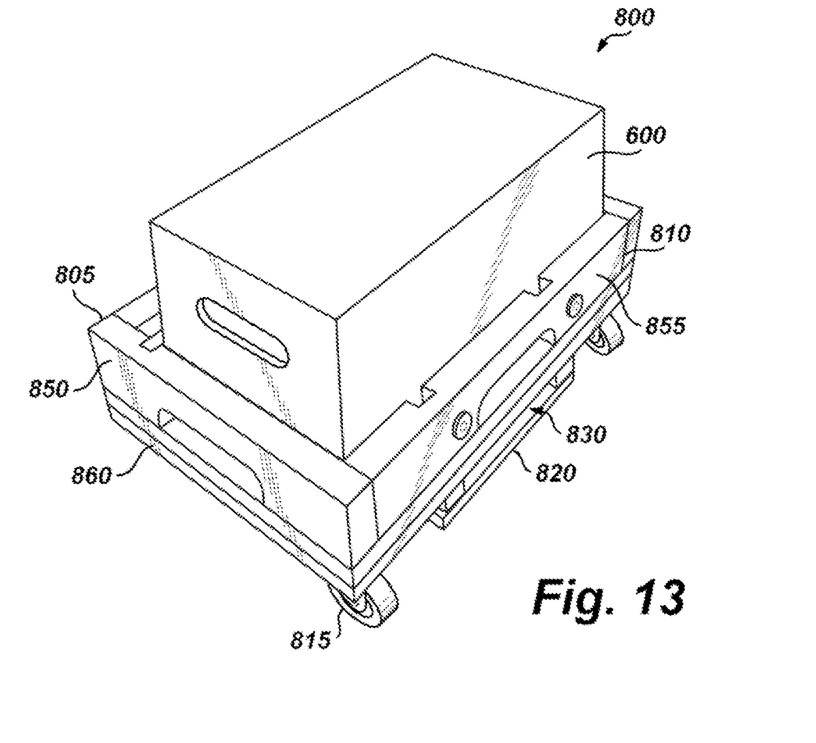
FIG. 13 is a perspective view of at least some exemplary embodiments of the present invention.

Further for example as illustrated in FIG. 13, film apple box 600 may be supported flatly in the "L.A. position" in adjustable recess 845. Film apple box 600 may be supported between first structural members 850 and second structural members 855. First adjustable members 835 may be removed from receiving recesses 850a and stored. For example, first adjustable members 835 may include magnets 865 that may be selectively disposed (e.g., and attracted to) magnets 870 disposed on second structural members 855 (FIG. 10 illustrates a magnetic attachment of first adjustable member 835 to second structural member 855). First adjustable members 835 may also be stored in cavity 830 and second adjustable members 840 may also be stored using magnetic attachment similar to first adjustable members 835.

Adjustable assembly 825 may be configured to support any exemplary disclosed size of film apple box 600. Apparatus 105 may also utilize an adjustable assembly similar to adjustable assembly 825 of apparatus 805. System 800 may be used similarly to system 100 for example as described above regarding process 700.

In at least some exemplary embodiments, the exemplary disclosed apparatus may be a dolly (e.g., a modular dolly) configured to be used in film and television production. The exemplary disclosed apparatus may allow film apple box 600 (e.g., a 20"×12"×8" full apple box) to be used as a seat at three heights (e.g., a 20" "New York position," a 12" "Chicago position," or an 8" "L.A. position"). Apparatus 105 (e.g., or apparatus 805) may be used in conjunction with film apple boxes 600, which may be used on most or substantially all film or television production sites. Apparatus 105 (e.g., or apparatus 805) may be a movable film apple box support (e.g., an apple box dolly).

In at least some exemplary embodiments, the exemplary disclosed apparatus may be symmetrical about one or more axes. For example as illustrated in FIG. 5, apparatus 105 (e.g., or apparatus 805) may be symmetrical about two axes (e.g., a first axis and a second axis).

In at least some exemplary embodiments, the exemplary disclosed method may include providing a body assembly (e.g., body assembly 110 or body assembly 810) including a first recess, a second recess, and a third recess, providing a film apple box, selectively supporting a first end portion of the film apple box in the first recess in a first orientation, selectively supporting a second end portion of the film apple box in the second recess in a second orientation, and selectively supporting a third end portion of the film apple box in the third recess in a third orientation. Providing the film apple box may include providing the film apple box during film or television shooting, the first orientation may be the "New York position" of film or television shooting, the second orientation may be the "Chicago position" of film or television shooting, and the third orientation may be the "L.A. position" of film or television shooting. The film apple box may be a "full apple" used in film or television shooting, and the first recess and the first end portion may both have dimensions of 8"×12". The film apple box may be a "full apple" used in film or television shooting, the second end portion may have dimensions of 8"×20", and the second recess may have dimensions of 8"×20" or more. The film apple box may be a "full apple" used in film or television shooting, the third end portion may have dimensions of 12"×20", and the third recess may have dimensions of 12"×20" or more. The body assembly may be a tiered body assembly in which the first recess may be disposed within the second recess, which may be disposed within the third recess. The exemplary disclosed method may also include changing the film apple box between the first orientation, the second orientation, and the third orientation based on film or television shooting. The exemplary disclosed method may further include rolling the body assembly on a surface using a plurality of wheel assemblies attached to the body assembly. The body assembly may be a single integral aluminum member cut from a block of aluminum. The body assembly and the film apple box may both be formed from plywood. The exemplary disclosed method may also include forming the first recess using a plurality of first adjustable members, which may be selectively received in a plurality of first receiving recesses of the body assembly, and a plurality of second adjustable members that may be selectively received in a plurality of second receiving recesses of the body assembly, and forming the second recess using the plurality of first adjustable members, which may be selectively received in the plurality of first receiving recesses of the body assembly, and a plurality of structural members of the body assembly. The exemplary disclosed method may further include selectively magnetically attaching the plurality of first adjustable members to an exterior surface of the body assembly.

In at least some exemplary embodiments, the exemplary disclosed apparatus be configured to support a film apple box during film or television shooting. The exemplary disclosed apparatus may include at least one base structural member, a plurality of width structural members and length structural members disposed on the at least one base structural member and forming a first recess with the at least one base structural member, the first recess configured to selectively receive a first end portion of the film apple box, a plurality of second-recess structural members disposed on the plurality of width structural members and length structural members and forming a second recess with the plurality of width structural members and length structural members, the second recess configured to selectively receive a second end portion of the film apple box, and a plurality of third-recess structural members disposed on the plurality of second-recess structural members and forming a third recess with the plurality of second-recess structural members, the third recess configured to selectively receive a third end portion of the film apple box. The first recess may be disposed within the second recess, which may be disposed within the third recess. Each of the plurality of second-recess structural members may overlap an entirety of one of the plurality of length structural members and a portion of each of the plurality of width structural members. Each of the plurality of second- recess structural members may be disposed between one of the plurality of length structural members and one of the plurality of third-recess structural members. The exemplary disclosed apparatus may also include a storage assembly attached to an opposite side of the at least one base structural member as the plurality of width structural members and length structural members, and a plurality of wheel assemblies attached to the opposite side of the at least one base structural member. A height of the plurality of wheel assemblies may be greater than a height of the storage assembly. An aperture may extend through a thickness of the at least one base structural member.

In at least some exemplary embodiments, the exemplary disclosed method may include providing a body assembly (e.g., body assembly 110 or body assembly 810) including a first recess, a second recess, and a third recess, providing a film apple box during film or television shooting, selectively supporting a first end portion of the film apple box in the first recess in a first orientation that may be the "New York position" of film or television shooting, selectively supporting a second end portion of the film apple box in the second recess in a second orientation that may be the "Chicago position" of film or television shooting, and selectively supporting a third end portion of the film apple box in the third recess in a third orientation that may be the "L.A. position" of film or television shooting. The first recess may be disposed within the second recess. The second recess may be disposed within the third recess. The film apple box may be a "full apple" used in film or television shooting, the "full apple" may have a length dimension of 20" that may be a vertical dimension when the "full apple" is supported in the first recess in the "New York position" of film or television shooting. The "full apple" may have a width dimension of 12" that may be the vertical dimension when the "full apple" is supported in the second recess in the "Chicago position" of film or television shooting. The "full apple" may have a depth dimension of 8" that may be the vertical dimension when the "full apple" is supported in the third recess in the "L.A. position" of film or television shooting. The body assembly may include at least one base structural member, a plurality of width structural members and length structural members disposed on the at least one base structural member and forming the first recess with the at least one base structural member, a plurality of second-recess structural members disposed on the plurality of width structural members and length structural members and forming the second recess with the plurality of width structural members and length structural members, and a plurality of third-recess structural members disposed on the plurality of second-recess structural members and forming the third recess with the plurality of second-recess structural members.

In at least some exemplary embodiments, the exemplary disclosed system, apparatus, and method may provide an efficient and effective system for providing a support or seat that may be used to comfortably support a user in a challenging position for an extended period of time. The exemplary disclosed system, apparatus, and method may provide an inexpensive support technique for supporting a user in a desired position. The exemplary disclosed system, apparatus, and method may provide a relatively rugged support system that may be used for an extended period of time in activities involving significant wear and tear such as film and television production.

It will be apparent to those skilled in the art that various modifications and variations can be made to the exemplary disclosed system, apparatus, and method. Other embodiments will be apparent to those skilled in the art from consideration of the specification and practice of the exemplary disclosed system, apparatus, and method. It is intended that the specification and examples be considered as exemplary, with a true scope being indicated by the following claims.

What is claimed is:

1. A method, comprising:
providing a body assembly including a first recess, a second recess, and a third recess;
providing a film apple box;
selectively supporting a first end portion of the film apple box in the first recess in a first orientation;
selectively supporting a second end portion of the film apple box in the second recess in a second orientation; and
selectively supporting a third end portion of the film apple box in the third recess in a third orientation.

2. The method of claim 1, wherein:
providing the film apple box includes providing the film apple box during film or television shooting;
the first orientation is the "New York position" of film or television shooting;
the second orientation is the "Chicago position" of film or television shooting; and
the third orientation is the "L.A. position" of film or television shooting.

3. The method of claim 1, wherein:
the film apple box is a "full apple" used in film or television shooting; and
the first recess and the first end portion both have dimensions of 8" x 12".

4. The method of claim 1, wherein:
the film apple box is a "full apple" used in film or television shooting;
the second end portion has dimensions of 8" x 20"; and
the second recess has dimensions of 8" x 20" or more.

5. The method of claim 1, wherein:
the film apple box is a "full apple" used in film or television shooting;
the third end portion has dimensions of 12" x 20"; and
the third recess has dimensions of 12" x 20" or more.

6. The method of claim 1, wherein the body assembly is a tiered body assembly in which the first recess is disposed within the second recess, which is disposed within the third recess.

7. The method of claim 1, further comprising changing the film apple box between the first orientation, the second orientation, and the third orientation based on film or television shooting.

8. The method of claim 1, further comprising rolling the body assembly on a surface using a plurality of wheel assemblies attached to the body assembly.

9. The method of claim 1, wherein the body assembly is a single integral aluminum member cut from a block of aluminum.

10. The method of claim 1, wherein the body assembly and the film apple box are both formed from plywood.

11. The method of claim 1, further comprising:
forming the first recess using a plurality of first adjustable members, which are selectively received in a plurality of first receiving recesses of the body assembly, and a plurality of second adjustable members that are selectively received in a plurality of second receiving recesses of the body assembly; and
forming the second recess using the plurality of first adjustable members, which are selectively received in the plurality of first receiving recesses of the body assembly, and a plurality of structural members of the body assembly.

12. The method of claim 11, further comprising selectively magnetically attaching the plurality of first adjustable members to an exterior surface of the body assembly.

13. An apparatus configured to support a film apple box during film or television shooting, comprising:
at least one base structural member;
a plurality of width structural members and length structural members disposed on the at least one base structural member and forming a first recess with the at least one base structural member, the first recess configured to selectively receive a first end portion of the film apple box;
a plurality of second-recess structural members disposed on the plurality of width structural members and length structural members and forming a second recess with the plurality of width structural members and length structural members, the second recess configured to selectively receive a second end portion of the film apple box; and
a plurality of third-recess structural members disposed on the plurality of second-recess structural members and forming a third recess with the plurality of second-recess structural members, the third recess configured to selectively receive a third end portion of the film apple box;
wherein the first recess is disposed within the second recess, which is disposed within the third recess.

14. The apparatus of claim 13, wherein each of the plurality of second-recess structural members overlaps an entirety of one of the plurality of length structural members and a portion of each of the plurality of width structural members.

15. The apparatus of claim 14, wherein each of the plurality of second-recess structural members is disposed between one of the plurality of length structural members and one of the plurality of third-recess structural members.

16. The apparatus of claim 13, further comprising:
a storage assembly attached to an opposite side of the at least one base structural member as the plurality of width structural members and length structural members; and
a plurality of wheel assemblies attached to the opposite side of the at least one base structural member;
wherein a height of the plurality of wheel assemblies is greater than a height of the storage assembly; and
wherein an aperture extends through a thickness of the at least one base structural member.

17. A method, comprising:
providing a body assembly including a first recess, a second recess, and a third recess;
providing a film apple box during film or television shooting;
selectively supporting a first end portion of the film apple box in the first recess in a first orientation that is the "New York position" of film or television shooting;
selectively supporting a second end portion of the film apple box in the second recess in a second orientation that is the "Chicago position" of film or television shooting; and
selectively supporting a third end portion of the film apple box in the third recess in a third orientation that is the "L.A. position" of film or television shooting;
wherein the first recess is disposed within the second recess; and
wherein the second recess is disposed within the third recess.

18. The method of claim 17, wherein:
the film apple box is a "full apple" used in film or television shooting;
the "full apple" has a length dimension of 20" that is a vertical dimension when the "full apple" is supported in the first recess in the "New York position" of film or television shooting;
the "full apple" has a width dimension of 12" that is the vertical dimension when the "full apple" is supported in the second recess in the "Chicago position" of film or television shooting; and
the "full apple" has a depth dimension of 8" that is the vertical dimension when the "full apple" is supported in the third recess in the "L.A. position" of film or television shooting.

19. The method of claim 17, wherein the body assembly includes:
at least one base structural member;
a plurality of width structural members and length structural members disposed on the at least one base structural member and forming the first recess with the at least one base structural member;
a plurality of second-recess structural members disposed on the plurality of width structural members and length structural members and forming the second recess with the plurality of width structural members and length structural members; and
a plurality of third-recess structural members disposed on the plurality of second-recess structural members and forming the third recess with the plurality of second-recess structural members.

\* \* \* \* \*